US012339609B2

(12) United States Patent
Shibahara

(10) Patent No.: US 12,339,609 B2
(45) Date of Patent: Jun. 24, 2025

(54) IMAGE FORMING APPARATUS

(71) Applicant: KYOCERA Document Solutions Inc., Osaka (JP)

(72) Inventor: Masami Shibahara, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/731,803

(22) Filed: Jun. 3, 2024

(65) Prior Publication Data

US 2024/0411255 A1 Dec. 12, 2024

(30) Foreign Application Priority Data

Jun. 8, 2023 (JP) ................................ 2023-094849

(51) Int. Cl.
*G03G 15/00* (2006.01)

(52) U.S. Cl.
CPC ..... *G03G 15/5041* (2013.01); *G03G 15/5037* (2013.01); *G03G 15/5058* (2013.01)

(58) Field of Classification Search
CPC ........... G03G 15/5037; G03G 15/5041; G03G 15/5058; G03G 15/5062; G03G 2215/00029; G03G 2215/00033; G03G 2215/00037; G03G 2215/00042; G03G 2215/00063; G03G 2215/00067
See application file for complete search history.

(56) References Cited

U.S. PATENT DOCUMENTS

2011/0002702 A1* 1/2011 Niijima .................. G03G 15/50 399/49
2011/0026953 A1* 2/2011 Tomita ................. G03G 15/161 399/49
2016/0252863 A1* 9/2016 Sonoda ................ G03G 15/556 399/49

FOREIGN PATENT DOCUMENTS

JP 2007-155856 A 6/2007
JP 2019174581 A * 10/2019

* cited by examiner

*Primary Examiner* — Carla J Therrien
(74) *Attorney, Agent, or Firm* — Stein IP LLC

(57) ABSTRACT

A control unit of an image forming apparatus can perform a density correction mode to correct toner density, based on detection results of toner density of a plurality of reference images formed with density gradations changed sequentially in a plurality of steps, detects presence or absence of a change in the voltage in each density gradation, based on the toner density detection value detected in the density correction mode, and if the density gradation has a specific density gradation in which a change in the voltage is detected, it corrects the toner density of the specific density gradation, using the detection values of density gradations before and after the specific density gradation.

6 Claims, 7 Drawing Sheets

IMAGE FORMING APPARATUS

INCORPORATION BY REFERENCE

This application is based upon and claims the benefit of priority from the corresponding Japanese Patent Application No. 2023-094849 filed Jun. 8, 2023, the entire contents of which are hereby incorporated by reference.

BACKGROUND

The present disclosure relates to an image forming apparatus.

An electrophotographic image forming apparatus such as a copier or a printer generally uses a device of forming a toner image to be transferred onto a paper sheet later, by supplying toner to an electrostatic latent image formed on outer circumference surface of a photosensitive drum as an image carrier, so as to develop the same. The density of the toner image formed by the image forming apparatus can change over time due to various reasons. Therefore, it is usual to perform calibration, in which a toner image for density correction (reference image) is formed on an outer circumference surface of the photosensitive drum or an intermediate transfer belt, and toner density of the toner image is detected by a sensor, so as to perform density correction.

SUMMARY

An image forming apparatus according to one aspect of the present disclosure includes an image carrier, a charging unit, an exposing unit, a developing unit, a density detection unit, and a control unit. The image carrier has a photosensitive layer formed on its outer circumference surface. The charging unit charges the outer circumference surface of the image carrier at a predetermined surface potential. The exposing unit exposes the outer circumference surface of the image carrier charged by the charging unit, so as to form an electrostatic latent image whose charge is decreased. The developing unit supplies toner to the electrostatic latent image on the image carrier so as to form a toner image. The density detection unit outputs a detection value of toner density of the toner image on the image carrier. The control unit controls the image carrier, the charging unit, the exposing unit, and the developing unit. The density detection unit includes a light emitting unit configured to emit light to the toner image when being applied with a predetermined voltage, and a single light receiving unit configured to receive reflection light reflected by the toner image. The control unit is capable of performing a density correction mode, in which reference images as the toner image for density correction are formed with density gradations changed sequentially in a plurality of steps, toner densities of the formed reference images are each detected by the density detection unit, and the toner density is corrected on the basis of detection results. On the basis of the detection values of the toner density detected in the density correction mode, the control unit detects presence or absence of a change in the voltage in each density gradation. If the density gradation has a specific density gradation in which a change in the voltage is detected, the control unit corrects the toner density of the specific density gradation, using the detection values of density gradations before and after the specific density gradation.

DETAILED DESCRIPTION

Hereinafter, an embodiment of the present disclosure is described with reference to the drawings. Note that the present disclosure is not limited to the following description.

Figure 1:
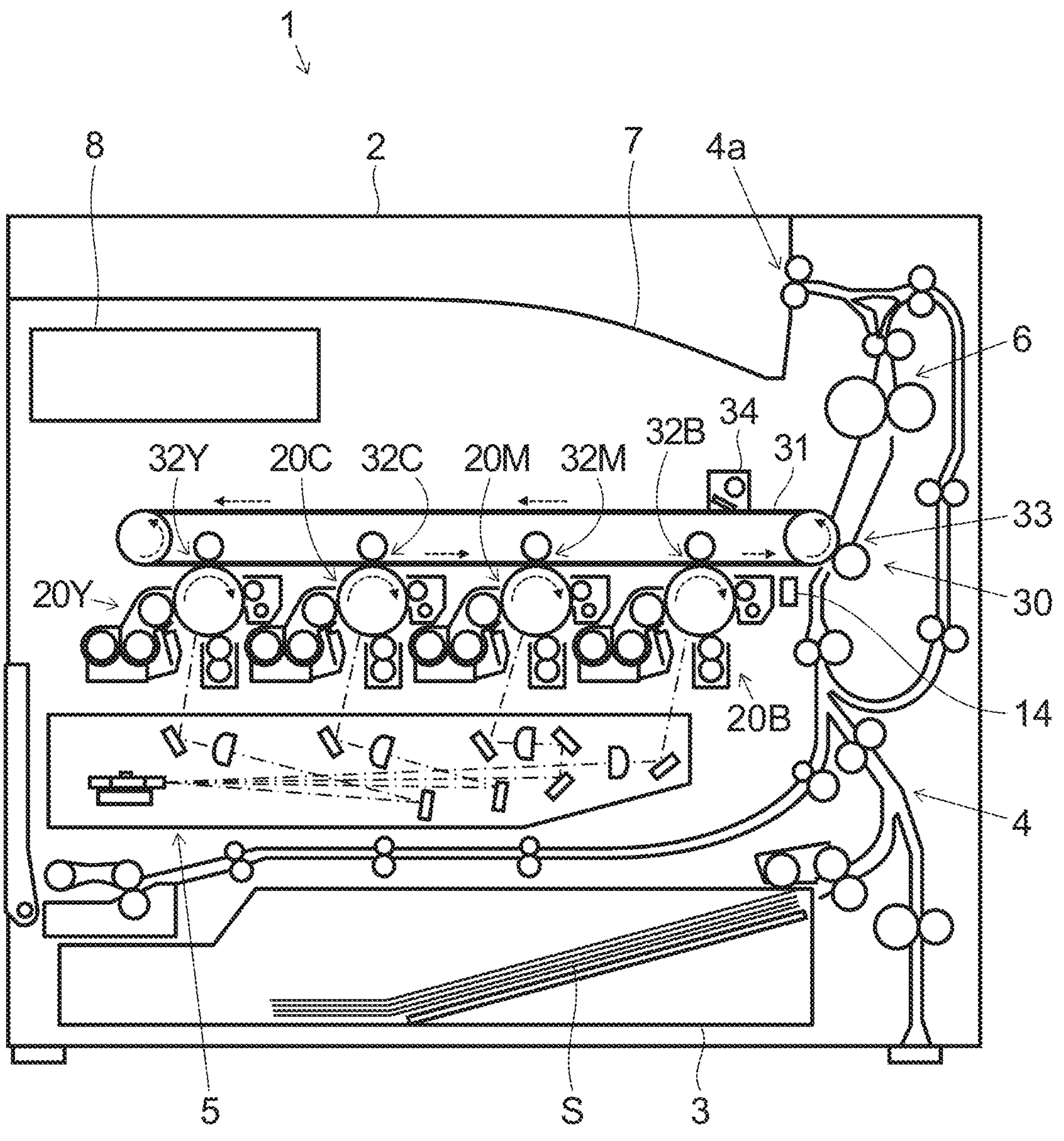
FIG. 1 is a schematic cross sectional front view of an image forming apparatus of one embodiment of the present disclosure.
Figure 2:
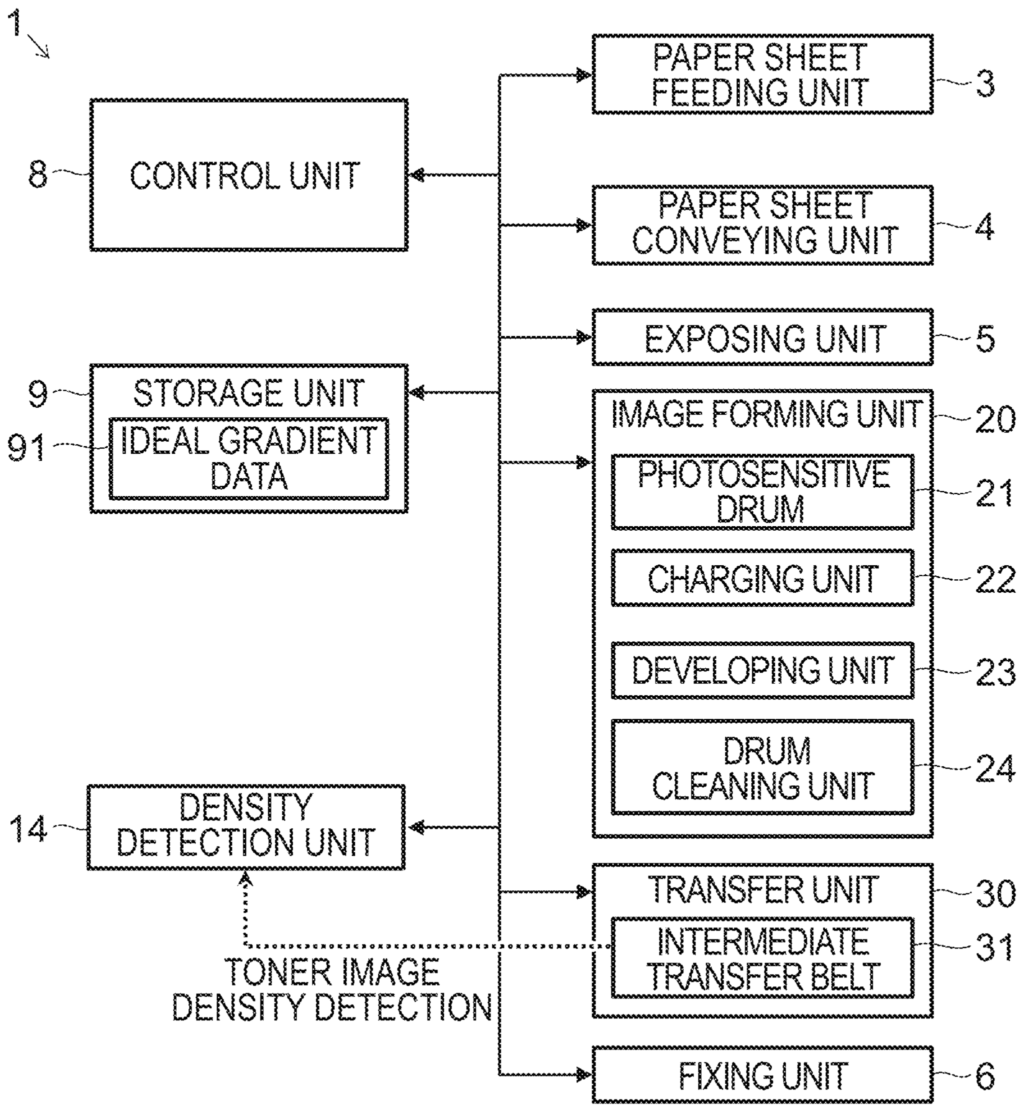
FIG. 2 is a block diagram illustrating a structure of the image forming apparatus illustrated in FIG. 1.
Figure 3:
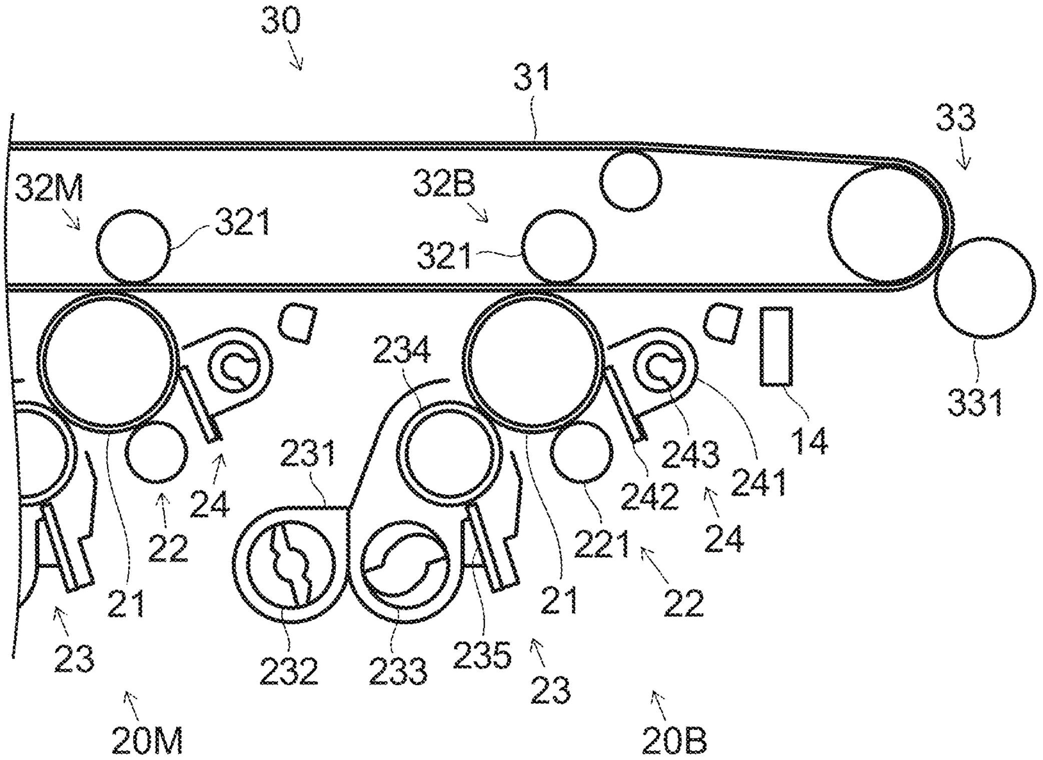
FIG. 3 is a schematic cross sectional front view of the image forming unit and its vicinity of the image forming apparatus illustrated in FIG. 1.

FIG. 1 is a schematic cross sectional front view of an image forming apparatus 1 according to the embodiment. FIG. 2 is a block diagram illustrating a structure of the image forming apparatus 1 illustrated in FIG. 1. FIG. 3 is a schematic cross sectional front view of an image forming unit 20 and its vicinity of the image forming apparatus 1 illustrated in FIG. 1. The image forming apparatus 1 of this embodiment is, for example, a tandem type color printer that uses an intermediate transfer belt 31 to transfer toner images onto a paper sheet S. The image forming apparatus 1 may be a so-called multifunction peripheral having functions of printing, scanning (image reading), facsimile transmission, and the like, for example.

As illustrated in FIGS. 1, 2, and 3, the image forming apparatus 1 includes a paper sheet feeding unit 3, a paper sheet conveying unit 4, an exposing unit 5, the image forming unit 20, a transfer unit 30, a fixing unit 6, a paper sheet discharge unit 7, a control unit 8, and a storage unit 9, which are disposed in a main body 2 of the apparatus.

The paper sheet feeding unit 3 is disposed in a bottom part of the main body 2. The paper sheet feeding unit 3 stores a plurality of paper sheets S before printing, and sends out the paper sheets S after separating one by one when printing is performed. The paper sheet conveying unit 4 extends along a side wall of the main body 2 in an up and down direction. The paper sheet conveying unit 4 conveys the paper sheet S sent out from the paper sheet feeding unit 3 to a secondary transfer unit 33 and the fixing unit 6, and further discharges the paper sheet S after fixing onto the paper sheet discharge unit 7 through a paper sheet discharge port 4*a*. The exposing unit 5 is disposed above the paper sheet feeding unit 3. The exposing unit 5 emits a laser beam, which is controlled based on image data, to the image forming unit 20.

The image forming unit 20 is disposed above the exposing unit 5 and below the intermediate transfer belt 31. The image forming unit 20 includes a yellow image forming unit 20Y, a cyan image forming unit 20C, a magenta image forming unit 20M, and a black image forming unit 20B. These four image forming units 20 have the same basic structure. Therefore, in the following description, the suffix "Y", "C", "M", or "B" indicating each color may be omitted unless limitation is necessary.

The image forming unit 20 includes a photosensitive drum (image carrier) 21 supported in a rotatable manner in a predetermined direction (in a clockwise direction in FIGS. 1 and 3). The image forming unit 20 further includes a charging unit 22, a developing unit 23, and a drum cleaning unit 24, which are disposed around the photosensitive drum 21 along a rotation direction thereof. Note that a primary transfer unit 32 is disposed between the developing unit 23 and the drum cleaning unit 24.

The photosensitive drum 21 has a photosensitive layer formed on its outer circumference surface. The charging unit 22 charges the outer circumference surface of the photosensitive drum 21 at a predetermined surface potential. The exposing unit 5 exposes the outer circumference surface of the photosensitive drum 21 charged by the charging unit 22, so as to form an electrostatic latent image of an original image, whose charge is decreased, on the outer circumference surface of the photosensitive drum 21. The developing unit 23 supplies toner to the electrostatic latent image on the outer circumference surface of the photosensitive drum 21, so as to develop and form a toner image. The four image forming units 20 respectively form toner images of different colors. The drum cleaning unit 24 removes and cleans toner and the like remaining on the outer circumference surface of the photosensitive drum 21, after the toner image is primarily transferred onto an outer circumference surface of the intermediate transfer belt 31. In this way, the image forming unit 20 forms the image (toner image) to be transferred later onto the paper sheet S.

The transfer unit 30 includes the intermediate transfer belt 31, primary transfer units 32Y, 32C, 32M, and 32B, the secondary transfer unit 33, and a belt cleaning unit 34. The intermediate transfer belt 31 is disposed above the four image forming units 20. The intermediate transfer belt 31 is an endless intermediate transfer body supported in a rotatable manner in a predetermined direction (in a counterclockwise direction in FIGS. 1 and 3), on which the toner images that are respectively formed by the four image forming units 20 are sequentially overlaid and primarily transferred. The four image forming units 20 are arranged in a row from an upstream side to a downstream side in the rotation direction of the intermediate transfer belt 31, as a so-called tandem system.

The primary transfer units 32Y, 32C, 32M, and 32B are disposed above the image forming units 20Y, 20C, 20M, and 20B of individual colors, respectively with the intermediate transfer belt 31 between them. The secondary transfer unit 33 is disposed on the upstream side of the fixing unit 6 in the paper sheet conveying direction of the paper sheet conveying unit 4, and on the downstream side of the four image forming units 20Y, 20C, 20M, and 20B in the rotation direction of the intermediate transfer belt 31. The belt cleaning unit 34 is disposed on the downstream side of the secondary transfer unit 33 in the rotation direction of the intermediate transfer belt 31.

The primary transfer unit 32 transfers the toner image formed on the outer circumference surface of the photosensitive drum 21 onto the intermediate transfer belt 31. In other words, the toner images are primarily transferred from the primary transfer units 32Y, 32C, 32M, and 32B of individual colors onto the outer circumference surface of the intermediate transfer belt 31. Further, along with the rotation of the intermediate transfer belt 31, the toner images on the four image forming units 20 are sequentially overlaid and transferred onto the intermediate transfer belt 31 at predetermined timings, and thus a color toner image, in which yellow, cyan, magenta, and black color toner images are overlaid, is formed on the outer circumference surface of the intermediate transfer belt 31.

The color toner image on the outer circumference surface of the intermediate transfer belt 31 is transferred onto the paper sheet S, which has been conveyed by the paper sheet conveying unit 4 in a synchronizing manner, in a secondary transfer nip part formed by the secondary transfer unit 33. The belt cleaning unit 34 removes and cleans adhered matter, such as toner and the like, remaining on the outer circumference surface of the intermediate transfer belt 31, after the secondary transfer. In this way, the transfer unit 30 transfers (records) the toner images formed on the outer circumference surfaces of the photosensitive drums 21 onto the paper sheet S.

The fixing unit 6 is disposed above the secondary transfer unit 33. The fixing unit 6 heats and presses the paper sheet S with the transferred toner image, so as to fix the toner image to the paper sheet S.

The paper sheet discharge unit 7 is disposed above the transfer unit 30. The paper sheet S with the fixed toner image after printing is completed is conveyed to the paper sheet discharge unit 7. The paper sheet discharge unit 7 enables the paper sheet after printing (printed matter) to be taken out from above.

The control unit 8 includes a CPU, an image processing unit, and other electronic circuits and components (which are not shown). The CPU controls operations of individual structural elements of the image forming apparatus 1, so as to perform processing related to functions of the image forming apparatus 1, on the basis of control programs and data stored in the storage unit 9. The paper sheet feeding unit 3, the paper sheet conveying unit 4, the exposing unit 5, the image forming unit 20, the transfer unit 30, and the fixing unit 6 receive instructions individually from the control unit 8, and work in cooperation with each other, so as to perform printing on the paper sheet S.

The storage unit 9 is constituted of a combination of a nonvolatile storage device (not shown) such as a program read only memory (ROM) and a data ROM, and a volatile storage device (not shown) such as a random access memory (RAM), for example.

Next, a structure of the image forming unit 20 and its vicinity is described with reference to FIG. 3. Note that the image forming units 20 of individual colors have the same basic structure, and hence the suffix indicating each color and description of each structural element are omitted unless limitation is necessary.

The image forming unit 20 includes the photosensitive drum 21, the charging unit 22, the developing unit 23, and the drum cleaning unit 24.

The photosensitive drum 21 has a cylindrical shape supported in a rotatable manner, whose center axis is in the horizontal direction, and it is driven by a drive unit (not shown) to rotate at a constant speed about the center axis. The photosensitive drum 21 includes a drum tube made of metal such as aluminum, and a photosensitive layer made of inorganic photosensitive material such as amorphous silicon formed on an outer circumference surface of the drum tube. The electrostatic latent image is formed on the outer circumference surface of the photosensitive drum 21.

The charging unit 22 includes a charging roller 221, for example. The charging roller 221 extends in parallel to the axis direction of the photosensitive drum 21, and is supported in a rotatable manner with its center axis in the horizontal direction. The charging roller 221 contacts the outer circumference surface of the photosensitive drum 21, so as to rotate following the rotation of the photosensitive drum 21. The charging roller 221 includes a core metal, and a conductive layer made of crosslinked rubber mixed with ion conductive material, formed on an outer circumference surface of the core metal. When the charging roller 221 is applied with a predetermined charging voltage, the outer circumference surface of the photosensitive drum 21 is uniformly charged.

The developing unit 23 is disposed on the downstream side of the charging unit 22 in the rotation direction of the photosensitive drum 21. The developing unit 23 includes a developer container 231, a first conveyance member 232, a second conveyance member 233, a developing roller (developer carrier) 234, and a regulating member 235.

The developer container 231 has an elongated shape extending in the axis direction of the photosensitive drum 21 (in the depth direction of FIG. 3), and is disposed so that its longitudinal direction is in the horizontal direction. The developer container 231 stores, for example, two-component developer containing toner and magnetic carrier, as developer containing toner to be supplied to the photosensitive drum 21.

The first conveyance member 232 and the second conveyance member 233 are each supported in the developer container 231, in a rotatable manner about an axis extending in parallel to the photosensitive drum 21. The first conveyance member 232 and the second conveyance member 233 rotate about their axes, respectively, so as to stir and convey the developer in opposite directions to each other along the rotation axis direction.

The developing roller 234 is positioned above the second conveyance member 233 in the developer container 231, and is disposed to face the photosensitive drum 21. The developing roller 234 is supported in the developer container 231, in a rotatable manner about an axis extending in parallel to the axis of the photosensitive drum 21. A part of the outer circumference surface of the developing roller 234 is exposed from the developer container 231 so as to face and be close to the photosensitive drum 21. The developing roller 234 carries the developer containing the toner in the developer container 231 so as to supply the same to the photosensitive drum 21. In other words, the developing roller 234 allows the toner in the developer container 231 to adhere to the electrostatic latent image on the outer circumference surface of the photosensitive drum 21 so as to form the toner image.

The regulating member 235 is disposed on an upstream side of a facing area between the developing roller 234 and the photosensitive drum 21, in the rotation direction of the developing roller 234. The regulating member 235 faces and is close to the developing roller 234, and is disposed with a predetermined gap between its tip and the outer circumference surface of the developing roller 234. The regulating member 235 extends over the entire length of the developing roller 234 in the axis direction.

The developer in the developer container 231 is circulated, stirred, and charged by rotations of the first conveyance member 232 and the second conveyance member 233, and is carried on the outer circumference surface of the developing roller 234. The developer carried on the outer circumference surface of the developing roller 234 has its layer thickness regulated by the regulating member 235. When the developing roller 234 is applied with a predetermined development voltage, due to a potential difference between itself and a surface potential of the outer circumference surface of the photosensitive drum 21, the toner in the developer carried on the outer circumference surface of the developing roller 234 moves to the outer circumference surface of the photosensitive drum 21, in the facing area with the photosensitive drum 21. In this way, the electrostatic latent image on the outer circumference surface of the photosensitive drum 21 is developed by the toner.

The drum cleaning unit 24 is disposed on the downstream side of the primary transfer unit 32 in the rotation direction of the photosensitive drum 21. The drum cleaning unit 24 includes a collecting container 241, a cleaning blade 242, and a collecting spiral 243.

The collecting container 241 has an elongated shape extending in the axis direction of the photosensitive drum 21 (in the depth direction of FIG. 3), and is disposed so that its longitudinal direction is in the horizontal direction. The collecting container 241 stores residual material such as toner removed from the outer circumference surface of the photosensitive drum 21 by the cleaning blade 242.

The cleaning blade 242 has a plate-like shape extending in the axis direction of the photosensitive drum 21, and is made of elastic material such as polyurethane rubber. The cleaning blade 242 contacts the photosensitive drum 21, and is disposed on the downstream side of the contact line in the drum rotation direction, so that a predetermined angle is formed between the cleaning blade 242 and the tangent of the photosensitive drum 21 at the contact line. The cleaning blade 242 contacts the outer circumference surface of the photosensitive drum 21 with a predetermined pressure. The cleaning blade 242 removes residue containing toner remaining on the outer circumference surface of the photosensitive drum 21, after the primary transfer.

The collecting spiral 243 is disposed in a lower part of the collecting container 241 in an area apart from the photosensitive drum 21 via the cleaning blade 242. The collecting spiral 243 is supported in the collecting container 241, in a rotatable manner about an axis extending in parallel to the rotation axis of the photosensitive drum 21. The collecting spiral 243 has a spiral conveying blade extending in the axis direction, for example. The collecting spiral 243 conveys the residue such as toner removed from the outer circumference surface of the photosensitive drum 21, to a collected waste container (not shown) disposed outside the drum cleaning unit 24.

The image forming apparatus 1 further includes a density detection unit 14. The density detection unit 14 is disposed on the upstream side of the secondary transfer unit 33 in the rotation direction of the intermediate transfer belt 31, and on the downstream side of the most downstream black image forming unit 20B among the four image forming units 20.

The density detection unit 14 faces the outer circumference surface of the intermediate transfer belt 31.

Figure 4:
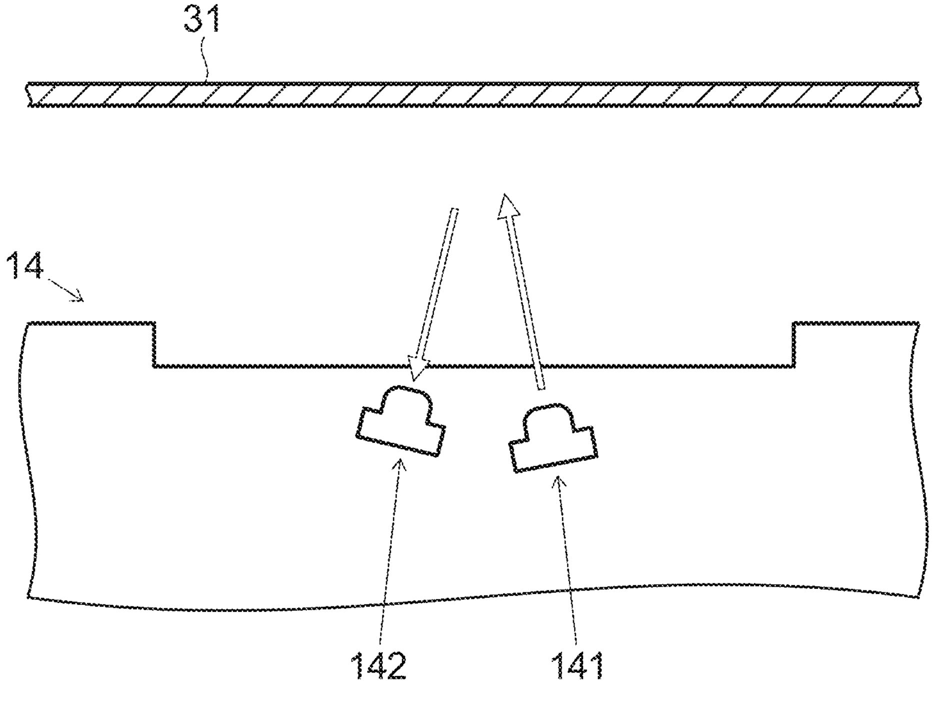
FIG. 4 is a partial side view of a density detection unit illustrated in FIG. 3.

FIG. 4 is a partial side view of the density detection unit 14 illustrated in FIG. 3. FIG. 4 is a diagram of the density detection unit 14 illustrated in FIG. 3, viewed from the side in FIG. 3 along the rotation direction of the intermediate transfer belt 31.

The density detection unit 14 is constituted of a reflection type optical sensor that includes a light emitting unit 141 having a light emitting element such as a light emitting diode (LED), and a light receiving unit 142 having a light receiving element such as a photodiode, for example. The light emitting unit 141 emits detection light to the toner image primarily transferred onto the outer circumference surface of the intermediate transfer belt 31, at a predetermined angle. The light receiving unit 142 receives the detection light that is emitted from the light emitting unit 141 to the toner image and is reflected by the toner image.

Note that, as a method of detecting toner density of the toner image, there are two types. One is a method of receiving regularly reflected detection light, and the other is a method of receiving diffusely reflected detection light. This embodiment describes the detection method of receiving regularly reflected light.

The density detection unit 14 outputs a level of the detection light received by the light receiving unit 142, as a detection value (voltage value) related to the toner density, thereby a toner amount of the toner image primarily transferred onto the outer circumference surface of the intermediate transfer belt 31 can be derived, and the toner density of the toner image can be detected. If there is no toner on the outer circumference surface of the intermediate transfer belt 31, the detection light emitted from the light emitting unit 141 is regularly reflected without diffuse reflection by the toner, and much of the light enters the light receiving unit 142. In this way, the detection value (voltage value) related to the toner density is high. Further, when the toner amount on the outer circumference surface of the intermediate transfer belt 31 increases, more light is diffusely reflected by the toner, and the light amount entering the light receiving unit 142 decreases gradually. In other words, the detection value (voltage value) related to the toner density decreases gradually.

In this way, the density detection unit 14 emits the detection light from the light emitting unit 141 to the toner image, and detects the toner density of the toner image transferred onto the outer circumference surface of the intermediate transfer belt 31, on the basis of the detection light received by the light receiving unit 142 after being reflected by the toner image. In other words, the density detection unit 14 outputs the detection value related to the toner density of the toner image formed on the outer circumference surface of the photosensitive drum 21 in the image forming unit 20, so as to detect the toner density.

Further, the control unit 8 of the image forming apparatus 1 of this embodiment performs a density correction mode as calibration, in which the density of the toner image is corrected regularly, such as every predetermined number of printed sheets, or at any timing of operation by a user or administrator, during non-image formation period. In this density correction mode, reference images (patch images) as the toner image for density correction are formed with density gradations changed sequentially in a plurality of steps, on the outer circumference surface of the photosensitive drum 21, which are transferred onto the outer circumference surface of the intermediate transfer belt 31, and the toner density of each of the plurality of reference images is detected by the density detection unit 14. On the basis of the detection results, the control unit 8 compares the density (measured value) of each of the plurality of reference images for density correction with a predetermined target density (ideal value), and adjusts developing bias or the like, for example, so as to correct the toner density.

Figure 5:
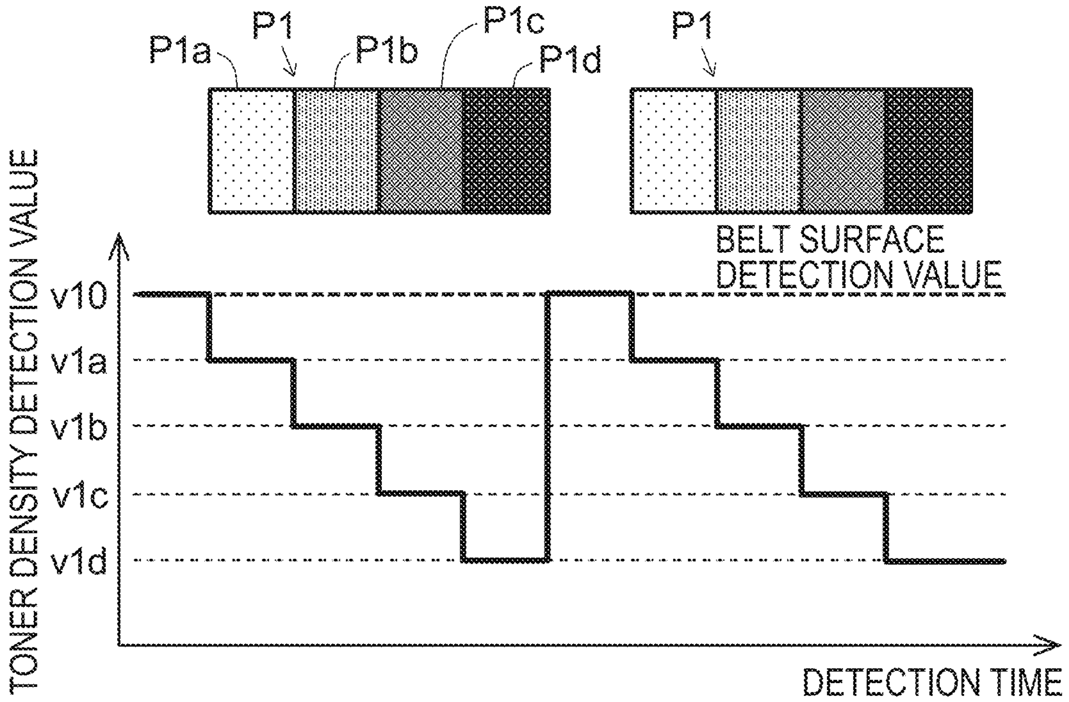
FIG. 5 is an explanatory diagram illustrating a reference image group for density correction, and detection value by the density detection unit of the image forming apparatus illustrated in FIG. 1.

FIG. 5 is an explanatory diagram illustrating a reference image group P1 for density correction, and detection value by the density detection unit 14 of the image forming apparatus 1 illustrated in FIG. 1. The upper part of FIG. 5 shows two reference image groups P1 for density correction. The lower part of FIG. 5 shows a graph indicating toner density detection values of the reference image groups P1. Note that the graph illustrated in FIG. 5 is a line graph of ideal toner density of the reference image groups P1. In FIG. 5, the left and right direction of the reference image group P1 corresponds to the circumferential direction of the photosensitive drum 21 (i.e., the rotation direction of the intermediate transfer belt 31), and has the same timing as detection time of toner density that is the horizontal axis of the graph. The vertical axis of the graph is the toner density detection value (voltage value) output from the density detection unit 14. The "belt surface detection value" is detection value v10 output from the density detection unit 14, in the state where there is no toner on the outer circumference surface of the intermediate transfer belt 31.

The reference image group P1 for density correction has a band-like shape, in which rectangular reference images, each of which extends in the axis direction and in the circumferential direction of the photosensitive drum 21, are formed with density gradations changed sequentially in a plurality of steps, continuously in the circumferential direction of the photosensitive drum 21. In this embodiment, the reference image group P1 has four reference images P1*a*, P1*b*, P1*c*, and P1*d*.

The four reference images P1*a*, P1*b*, P1*c*, and P1*d* have different toner amounts per unit area, which increase toward the downstream side in the circumferential direction of the photosensitive drum 21 (i.e., in the rotation direction of the intermediate transfer belt 31), namely toward the right side in FIG. 5, and hence the toner density is also increases toward the same. In other words, the toner density increases in order of the reference images P1*a*, P1*b*, P1*c*, and P1*d*. With respect to the belt surface detection value v10 output from the density detection unit 14, detection values v1*a*, v1*b*, v1*c*, and v1*d* of the four reference images P1*a*, P1*b*, P1*c*, and P1*d* decrease in this order because the detection light is absorbed by the toner image.

Figure 6:
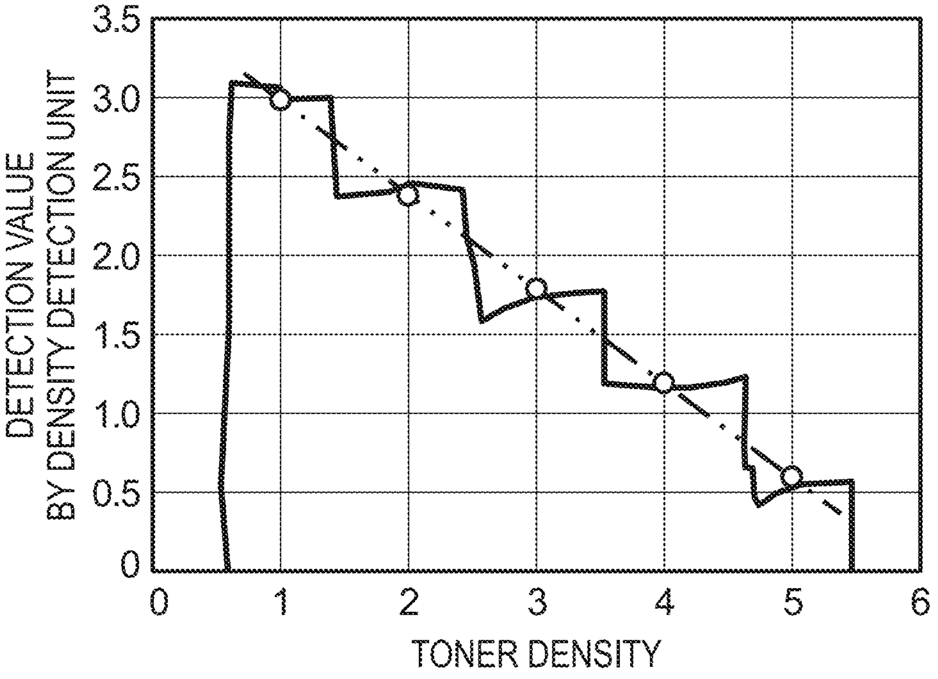
FIG. 6 is a graph illustrating a relationship between toner density and detection value by the density detection unit of the image forming apparatus illustrated in FIG. 1.

Further, the control unit 8 controls the density detection unit 14 to detect the toner density of each of the plurality of reference images P1*a*, P1*b*, P1*c*, and P1*d* for density correction formed as illustrated in FIG. 5. FIG. 6 is a graph illustrating a relationship between the toner density and the detection value by the density detection unit 14 of the image forming apparatus 1 illustrated in FIG. 1. In FIG. 6, the horizontal axis represents the toner density of image, and the vertical axis represents the detection value (voltage value) by the density detection unit 14 corresponding to the toner density. The line graph illustrated in FIG. 6 indicates the measured value of the toner density by the density detection unit 14 of the reference image group P1 (FIG. 5 is an example of ideal values). In FIG. 6, the double dot dashed line indicates an ideal gradient of the toner density detection values of the density gradation. Ideal gradient data 91 of the ideal gradient is stored in the storage unit 9 beforehand (see FIG. 2).

Further, the control unit 8 analyzes the plurality of toner density detection values and corrects the toner density, on the basis of the detection results by the density detection unit 14. In this case, the control unit 8 calculates gradient of the detection values (measured values) detected by the density detection unit 14, from toner density 1 to toner density 5 illustrated in FIG. 6. Then, the control unit 8 calculates difference between the calculated gradient of the detection values (measured values) and the ideal gradient of the detection values (the double dot dashed line in FIG. 6) stored in the storage unit 9, for example. If the difference is less than a predetermined value, the control unit 8 determines that there has been no change in the applied voltage to the density detection unit 14, which would be an obstacle to acquisition of appropriate toner density, and corrects the toner density on the basis of the density correction mode.

Next, there is described a process in the density correction mode, in the case where there has been a change in the applied voltage to the density detection unit 14.

Figure 7:
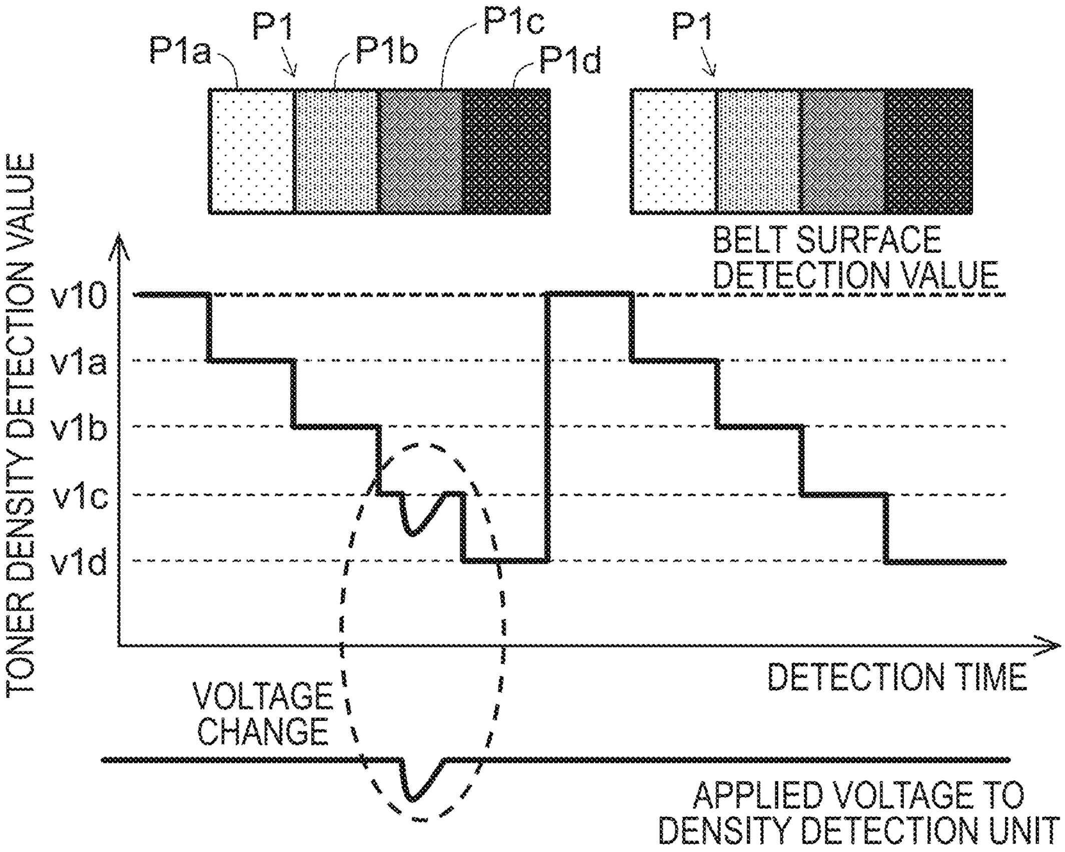
FIG. 7 is an explanatory diagram of the reference image group for density correction and the detection value by the density detection unit illustrated in FIG. 5, and is a diagram illustrating a state where a change has occurred in an applied voltage to the density detection unit.

FIG. 7 is an explanatory diagram of the reference image group P1 for density correction and the detection value by the density detection unit 14 illustrated in FIG. 5, and is a diagram illustrating a state where a change has occurred in the applied voltage to the density detection unit 14. The structure and format of FIG. 7 are substantially the same as those of FIG. 5, and hence description thereof is omitted. Note that, below the line graph indicating the toner density detection value of the reference image group P1, an output value is shown in a line, which indicates the applied voltage to the density detection unit 14.

If a change occurs in the applied voltage to the density detection unit 14, as illustrated in FIG. 7, the applied voltage changes rapidly (as shown in the area enclosed by a broken line in FIG. 7). In this case, as shown in the line graph illustrated in FIG. 7, a similar change occurs also in the toner density detection value, and hence appropriate toner density cannot be obtained.

Therefore, in the density correction mode, the control unit 8 detects presence or absence of a change in the voltage in each density gradation based on the toner density detection value. If there has been a change in the voltage, the control unit 8 regards the density gradation in which a change in the voltage is detected, as a specific density gradation. Then, if the density gradation has the specific density gradation in which a change in the voltage is detected, the control unit 8 corrects the toner density of the specific density gradation, using the detection values of density gradations before and after the specific density gradation.

With the structure described above, the density detection unit 14 having the single light receiving unit 142 detects a change in the applied voltage to the density detection unit 14, so that the toner density of the specific density gradation, in which a change in the voltage is detected, can be corrected. Therefore, appropriate density correction can be realized with a low cost structure.

Figure 8:
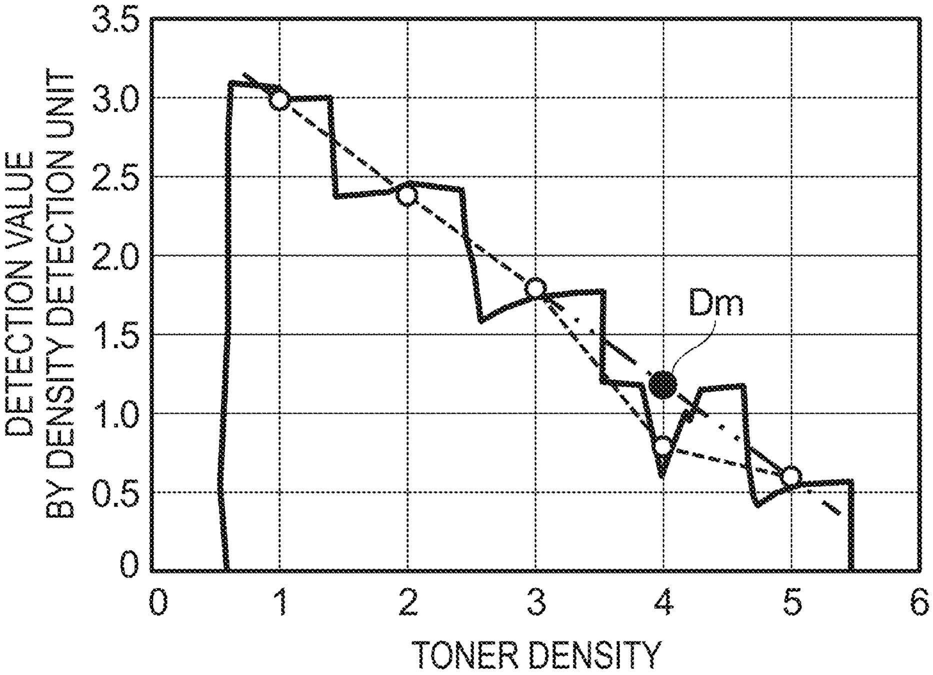
FIG. 8 is a graph illustrating a relationship between the toner density and the detection value by the density detection unit of the image forming apparatus illustrated in FIG. 1, and is a diagram illustrating a state where a change has occurred in the applied voltage to the density detection unit.

FIG. 8 is a graph illustrating a relationship between the toner density and the detection value by the density detection unit 14 of the image forming apparatus 1 illustrated in FIG. 1, and is a diagram illustrating a state where a change has occurred in the applied voltage to the density detection unit 14. The structure and format of FIG. 8 are substantially the same as those of FIG. 6, and hence description thereof is omitted. As illustrated in FIG. 8, the detection value of the toner density 4 is affected by a change in the applied voltage to the density detection unit 14.

As described above with reference to FIG. 6, the control unit 8 calculates the gradient of the detection values detected by the density detection unit 14 from the toner density 1 to the toner density 5 illustrated in FIG. 8 (the measured value, the broken line in FIG. 8). In this case, the control unit 8 calculates the gradient of the detection values, using the detection values of two or more neighboring density gradations.

More specifically, the control unit 8 calculates the gradient of the detection values (the broken line in FIG. 8), using the detection values of the toner density 1 and the toner density 2, the detection values of the toner density 2 and the toner density 3, the detection values of the toner density 3 and the toner density 4, the detection values of the toner density 1 and the toner density 3, the detection values of the toner density 2 and the toner density 4, the detection values of the toner density 1 and the toner density 4, or the like. In addition, it may be possible to use the detection values of three or four density gradations.

Then, the control unit 8 calculates a difference between the calculated gradient of the detection values (the measured value, the broken line in FIG. 8) and the ideal gradient of the detection values stored in the storage unit 9 (the double dot dashed line in FIG. 8). As shown in FIG. 8, in the toner density 4 in which a change has occurred in the applied voltage to the density detection unit 14, there is a difference between the calculated gradient of the detection values (the broken line in FIG. 8) and the ideal gradient (the double dot dashed line in FIG. 8), and the control unit 8 calculates this difference.

Further, if the difference between the calculated gradient of the detection values (the measured value) and the ideal gradient is the predetermined value or more, the control unit 8 determines that a change has occurred in the applied voltage to the density detection unit 14. Information about the predetermined value (threshold value) is stored in the storage unit 9 beforehand. The control unit 8 determines the density gradation indicating the toner density 4 in FIG. 8 to be the specific density gradation in which the voltage change has occurred.

With the structure described above, on the basis of the toner density detection value (voltage value) detected by the density detection unit 14, it can be recognized that a change has occurred in the applied voltage to the density detection unit 14. Further, on the basis of a difference between the gradient of the calculated detection value (measured value) and the ideal gradient, the toner density can be corrected in the density correction mode.

If there is the specific density gradation, the control unit 8 corrects the toner density of the specific density gradation, using the detection values of the density gradations before and after the specific density gradation. In other words, the control unit 8 corrects the toner density 4 of the specific density gradation, using the detection values of the toner density 3 and the toner density 5.

In this case, the control unit 8 calculates, for example, an intermediate value of the detection values of the density gradations before and after the specific density gradation, and corrects the toner density of the specific density gradation using the intermediate value. In the case of FIG. 8, the control unit 8 calculates an intermediate value Dm of the detection values of the toner density 3 and the toner density 5. Then, the control unit 8 corrects the toner density 4 of the specific density gradation using the intermediate value Dm. By correcting the toner density 4 using the intermediate value Dm calculated from the detection values of the toner density 3 and the toner density 5 as the measured values, it is possible to perform the density correction that supports characteristics and operating environment of the apparatus.

In other words, it is possible to realize appropriate density correction that is compatible to the image forming apparatus 1.

Note that it is also possible to determine presence or absence of the specific density gradation without using the ideal gradient of the detection values (ideal gradient data 91) stored in the storage unit 9. In this case, the control unit 8 calculates pseudo gradient of the detection values using the plurality of detection values detected by the density detection unit 14. In the case of FIG. 8, the control unit 8 calculates the pseudo gradient corresponding to the double dot dashed line in FIG. 8, using the detection values from the toner density 1 to the toner density 5.

More specifically, the control unit 8 calculates the pseudo gradient (the double dot dashed line in FIG. 8), using the detection values of the toner density 1 and the toner density 2, the detection values of the toner density 2 and the toner density 3, the detection values of the toner density 3 and the toner density 4, the detection values of the toner density 1 and the toner density 3, the detection values of the toner density 2 and the toner density 4, the detection values of the toner density 1 and the toner density 4, or the like. In addition, it may be possible to use the detection values of three or four density gradations. In the example of FIG. 8, the detection values of the toner density 1, the toner density 2, the toner density 3, and the toner density 5 are used, so as to calculate the pseudo gradient of the detection values (the double dot dashed line in FIG. 8).

Further, if there is the detection value whose difference from the pseudo gradient (the double dot dashed line in FIG. 8) is a predetermined value or more, the control unit 8 determines that the density gradation in which the detection value is detected to be the specific density gradation. In the case of FIG. 8, if a difference between the pseudo gradient (the double dot dashed line in FIG. 8) and the detection value of the toner density 4, in which a change has occurred in the applied voltage to the density detection unit 14, is a predetermined value or more, the density gradation indicating the toner density 4 is determined to be the specific density gradation in which the voltage change has occurred.

With the structure described above, it is possible to determine that the density gradation indicating the toner density 4 is the specific density gradation, using not the ideal gradient stored beforehand but the pseudo gradient of the detection values calculated from the detection values of the toner density 1, the toner density 2, the toner density 3, and the toner density 5, as the measured values. In this way, it is possible to perform the density correction that supports characteristics and operating environment of the apparatus. In other words, it is possible to realize appropriate density correction that is compatible to the image forming apparatus 1.

Figure 9:
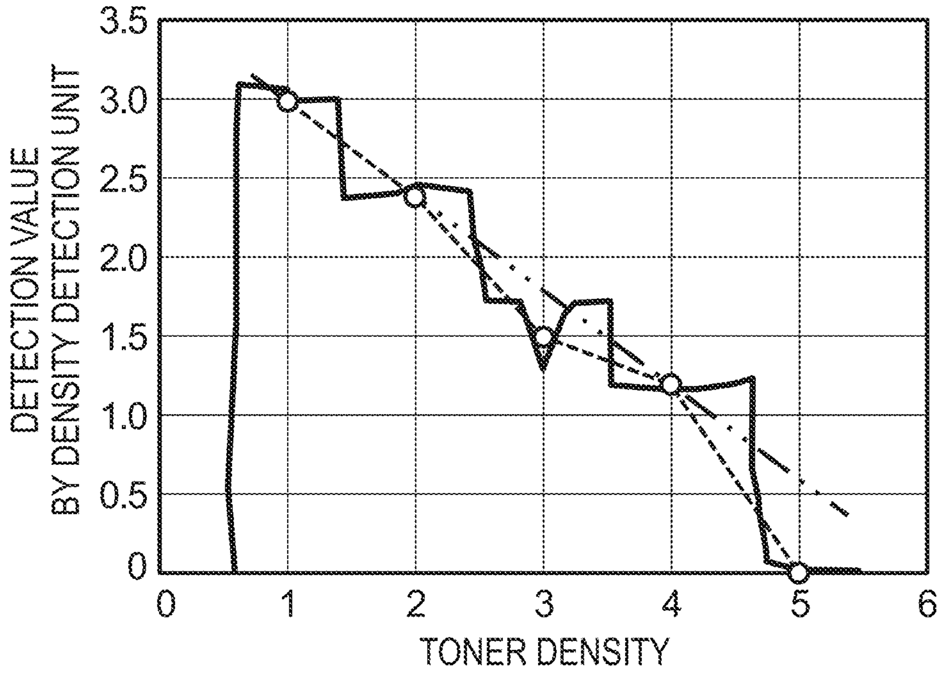
FIG. 9 is a graph illustrating a relationship between the toner density and the detection value by the density detection unit of the image forming apparatus illustrated in FIG. 1, and is a diagram illustrating a state where a deviation has occurred between two detection values.

FIG. 9 is a graph illustrating a relationship between the toner density and the detection value by the density detection unit 14 of the image forming apparatus 1 illustrated in FIG. 1, and is a diagram illustrating a state where a deviation has occurred between two detection values. The structure and format of FIG. 9 are substantially the same as those of FIGS. 6 and 8, and hence description thereof is omitted. As illustrated in FIG. 9, the detection values of the toner density 3 and the toner density 5 are affected by a change in the applied voltage to the density detection unit 14.

On the basis of the pseudo gradient of the detection values shown by the double dot dashed line in FIG. 9, the control unit 8 determines the density gradations indicating the toner density 3 and the toner density 5 to be the specific density gradations in which the voltage change has occurred. Note that the pseudo gradient of the detection values is calculated using the detection values of the toner density 1, the toner density 2, and the toner density 4.

If there are two or more detection values whose difference from the pseudo gradient is a predetermined value or more, the control unit 8 executes the density correction mode again. With this structure, it is possible to prevent execution of the density correction mode to correct the toner density based on the detection value of low reliability. In other words, appropriate density correction can be realized.

Figure 10:
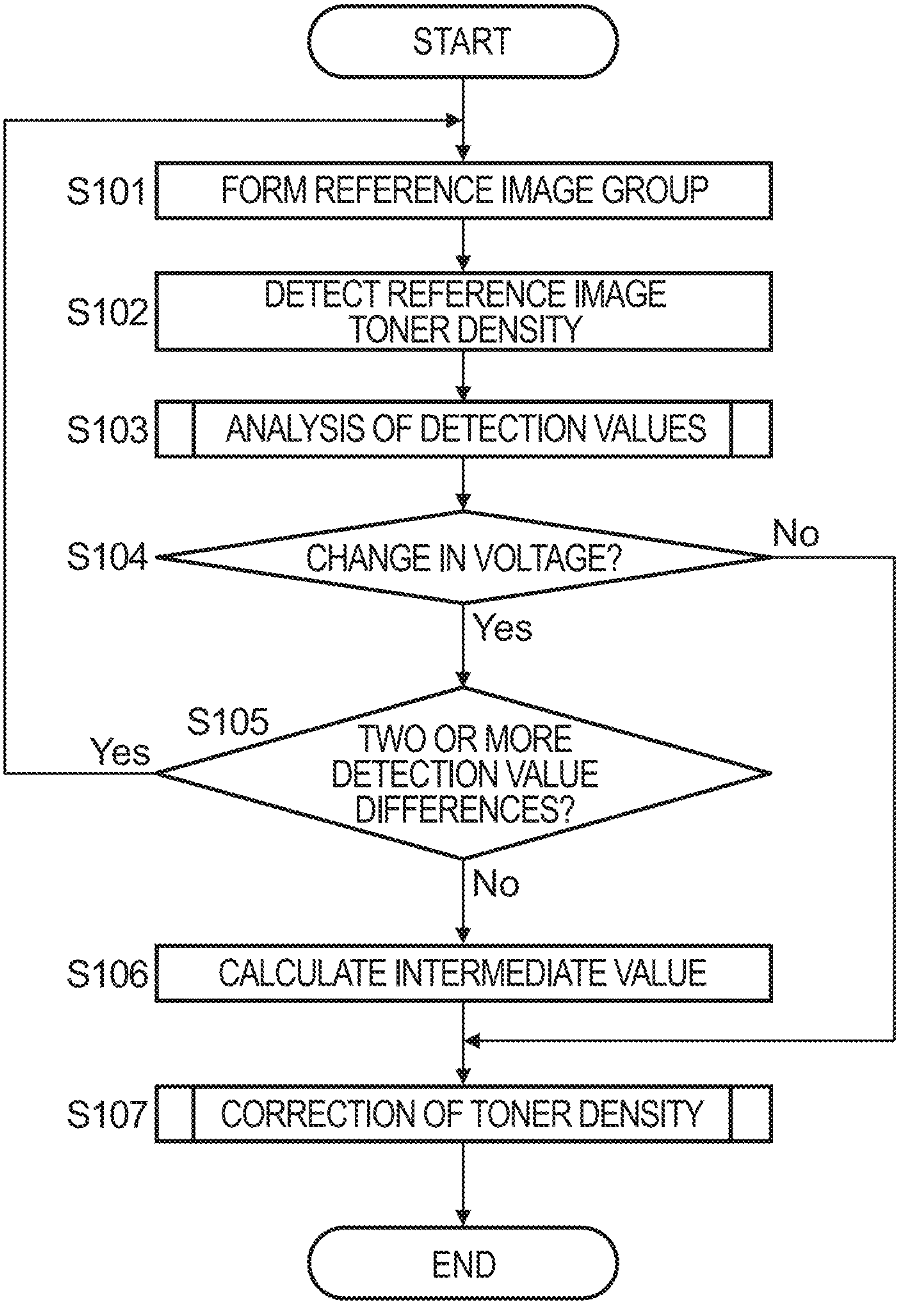
FIG. 10 is a flowchart illustrating a process in a density correction mode of the image forming apparatus illustrated in FIG. 1.

Next, a process flow in the density correction mode of the image forming apparatus 1 is described. FIG. 10 is a flowchart illustrating a process in the density correction mode of the image forming apparatus 1 illustrated in FIG. 1.

The image forming apparatus 1 performs the density correction mode every predetermined number of printed sheets, for example. In other words, when the number of printed sheets reaches the predetermined number ("START" in FIG. 10), the control unit 8 forms the reference image group P1 during non-image formation period (Step S101). The reference image group P1 is the toner image for density correction including the four reference images P1*a*, P1*b*, P1*c*, and P1*d*, which are sequentially formed on the outer circumference surface of the photosensitive drum 21, and are further transferred onto the outer circumference surface of the intermediate transfer belt 31.

Next, the control unit 8 controls the density detection unit 14 to detect the toner density of the reference image group P1 (the reference images P1*a*, P1*b*, P1*c*, and P1*d*) transferred onto the outer circumference surface of the intermediate transfer belt 31 (Step S102).

Note that it may be possible that the image forming apparatus 1 includes a plurality of density detection units 14, and that the plurality of density detection units 14 each detect the toner density of the reference image group P1 separately. For instance, the plurality of the density detection units 14 are arranged in parallel along the axis direction of the photosensitive drum 21 and the intermediate transfer belt 31. By detecting the toner density at a plurality of positions, reliability can be improved both in the density correction and in detection of a change in the applied voltage to the density detection unit 14.

Next, the control unit 8 analyzes the plurality of toner density detection values on the basis of the detection results by the density detection unit 14 (Step S103). As described above with reference to FIG. 6, for example, the control unit 8 calculates a difference between the ideal gradient of the detection values stored in the storage unit 9 and the gradient of the detection values, which are calculated using the detection values (measured values) detected by the density detection unit 14. In addition, as described above with reference to FIG. 8, for example, the control unit 8 calculates a difference between the detection value and the pseudo gradient of the detection values, which are calculated using the detection values (measured values) detected by the density detection unit 14.

Next, the control unit 8 determines whether or not a change has occurred in the applied voltage to the density detection unit 14 (Step S104). If a change has occurred in the voltage (Yes in Step S104), the process proceeds to Step S105, while if no change has occurred in the voltage (No in Step S104), the process proceeds to Step S107.

If a change has occurred in the applied voltage to the density detection unit 14, the control unit 8 determines whether or not there are two or more detection values whose difference from the pseudo gradient is a predetermined value or more (Step S105). If there are two or more such detection values (Yes in Step S105), the control unit 8 returns to Step S101, so as to execute the density correction mode again. If there is no or one such detection value (No in Step S105), the process proceeds to Step S106.

Note that, when using the ideal gradient to detect a change in the applied voltage to the density detection unit 14, the process in Step S105 is not performed. In other words, in Step S104, if the ideal gradient is used and a change has occurred in the applied voltage to the density detection unit 14, the process proceeds to Step S106.

Next, the control unit 8 calculates the intermediate value of the detection values of the density gradations with respect to the specific density gradation in which a change has occurred in the applied voltage to the density detection unit 14 (Step S106).

Further, the control unit 8 corrects the toner density (Step S107). If a change has not occurred in the applied voltage to the density detection unit 14, the control unit 8 corrects the toner density so as to be compatible to the ideal gradient of the detection values of the density gradation or to the pseudo gradient. In addition, if a change has occurred in the applied voltage to the density detection unit 14, the control unit 8 uses the intermediate value of the detection values of the density gradations, so as to correct the toner density of the specific density gradation. Then, the control unit 8 finishes the process of FIG. 10.

Although the embodiment of the present disclosure is described above, the scope of the present disclosure is not limited to this, but it is possible to add various modifications for implementation within the scope of the disclosure without deviating from the spirit thereof.

For instance, in the embodiment described above, the density detection unit 14 includes a light receiving element for detecting regularly reflected light, but instead, it may be possible to use a light receiving element for detecting diffusely reflected light.

In addition, in the embodiment described above, the image forming apparatus 1 is a so-called tandem type color printing image forming apparatus, in which a plurality of color images are sequentially overlaid and formed, but this type is not a limitation. The image forming apparatus may be a color printing image forming apparatus other than the tandem type or a monochrome printing image forming apparatus.

What is claimed is:

1. An image forming apparatus comprising:

an image carrier having a photosensitive layer formed on its outer circumference surface;

a charging unit configured to charge the outer circumference surface of the image carrier at a predetermined surface potential;

an exposing unit configured to expose the outer circumference surface of the image carrier charged by the charging unit, so as to form an electrostatic latent image whose charge is decreased;

a developing unit configured to supply toner to the electrostatic latent image on the image carrier so as to form a toner image;

a density detection unit configured to output a detection value of toner density of the toner image on the image carrier; and a control unit configured to control the image carrier, the charging unit, the exposing unit, and the developing unit, wherein the density detection unit includes a light emitting unit configured to emit light to the toner image when being applied with a predetermined voltage, and a single light receiving unit configured to receive reflection light reflected by the toner image, the control unit is capable of performing a density correction mode, in which reference images as the toner image for density correction are formed with density gradations changed sequentially in a plurality of steps, toner densities of the formed reference images are each detected by the density detection unit, and the toner density is corrected on the basis of detection results, on the basis of the detection values of the toner density detected in the density correction mode, the control unit detects presence or absence of a change in the voltage in each density gradation, and if the density gradation has a specific density gradation in which a change in the voltage is detected, the control unit corrects the toner density of the specific density gradation, using the detection values of density gradations before and after the specific density gradation.

2. The image forming apparatus according to claim 1, further comprising a storage unit storing an ideal gradient of the detection values of the toner density of the density gradation, and if a difference between the ideal gradient of the detection values stored in the storage unit and a gradient of the detection values detected by the density detection unit is a predetermined value or more, the control unit determines that the voltage change has occurred.

3. The image forming apparatus according to claim 2, wherein the control unit calculates the gradient of the detection values using the detection values of two or more neighboring density gradations, and calculates a difference between the calculated gradient of the detection values and the ideal gradient.

4. The image forming apparatus according to claim 1, wherein the control unit calculates a pseudo gradient of the detection values using a plurality of the detection values detected by the density detection unit, and if there is the detection value whose difference from the pseudo gradient is a predetermined value or more, the control unit determines that the density gradation in which the detection value is detected is the specific density gradation.

5. The image forming apparatus according to claim 4, wherein if there are two or more detection values whose difference from the pseudo gradient is a predetermined value or more, the control unit executes the density correction mode again.

6. The image forming apparatus according to claim 1, wherein if there is the specific density gradation, the control unit calculates an intermediate value of the detection values of the density gradations before and after the specific density gradation, and corrects the toner density of the specific density gradation using the intermediate value.

* * * * *